Figure 1:
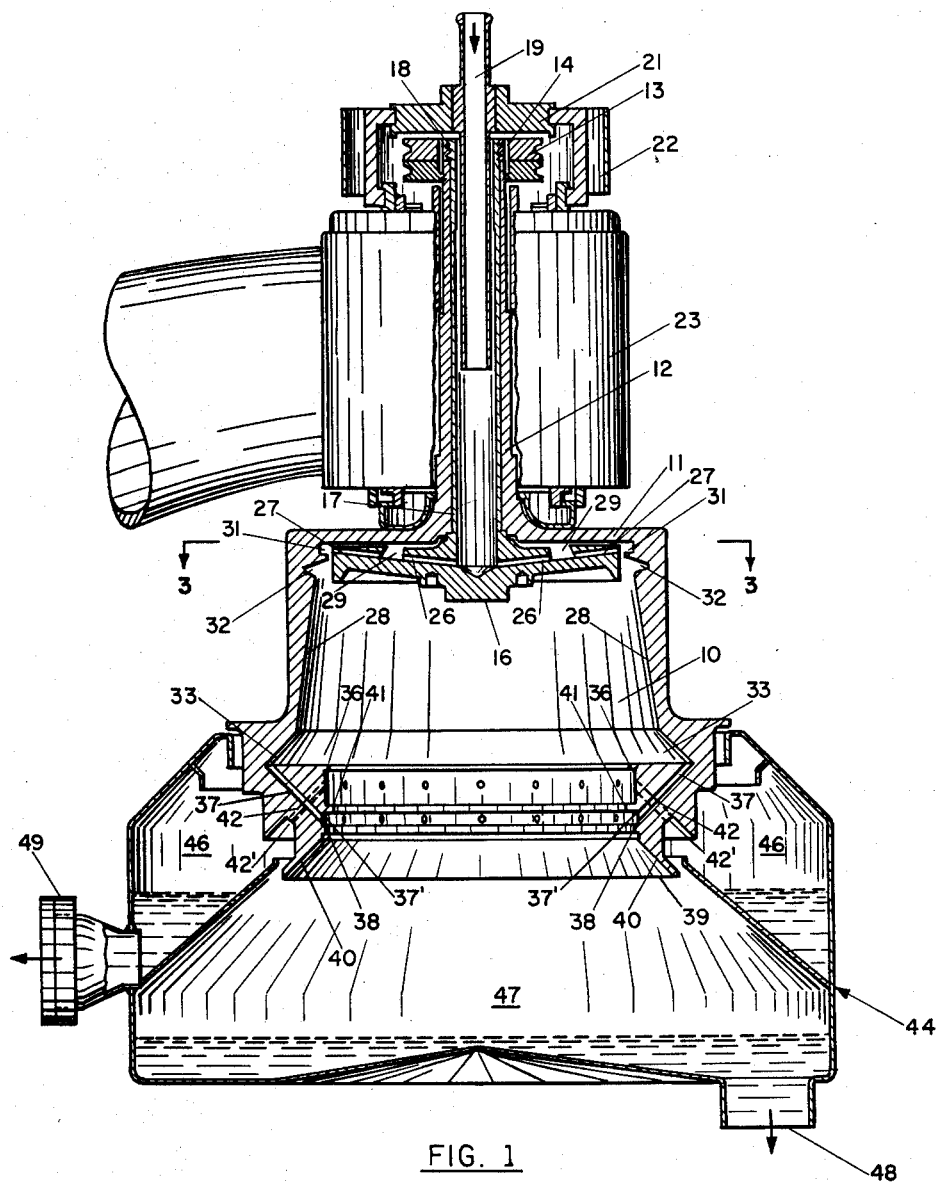

RICHARD L. MOYER
JOHN W. OTT
INVENTORS

BY Ernest G. Peterson
AGENT.

Dec. 18, 1962   R. L. MOYER ETAL   3,069,074
SEPARATOR ASSEMBLY FOR SEPERATION OF LIQUIDS
Filed Sept. 26, 1958   5 Sheets-Sheet 2

RICHARD L. MOYER
JOHN W. OTT
*INVENTOR.*

BY Ernest G. Peterson
AGENT

Dec. 18, 1962 R. L. MOYER ETAL 3,069,074
SEPARATOR ASSEMBLY FOR SEPERATION OF LIQUIDS
Filed Sept. 26, 1958 5 Sheets-Sheet 3

RICHARD L. MOYER
JOHN W. OTT
INVENTORS

BY Ernest G. Peterson

AGENT

RICHARD L. MOYER
JOHN W. OTT
INVENTORS

United States Patent Office 3,069,074
Patented Dec. 18, 1962

3,069,074
SEPARATOR ASSEMBLY FOR SEPARATION OF LIQUIDS
Richard L. Moyer, Roxbury Township, N.J., and John W. Ott, Fairfax, Wilmington, Del., assignors to Hercules Powder Company, Wilmington, Del., a corporation of Delaware
Filed Sept. 26, 1958, Ser. No. 763,750
9 Claims. (Cl. 233—32)

This invention relates to the separation of liquids by centrifugal force. In one aspect, this invention relates to a centrifugal separator system especially suitable for the separation of liquid explosive nitric esters from reaction mixtures containing same, which provides for a small holdup of liquids, and can be cleaned without being disassembled. In another aspect, this invention relates to a centrifugal separator system comprising in combination with a separator bowl assembly, a distributor unit for delivering liquid feed to the walls of the separator under conditions providing for a marked reduction in turbulence upon initial contact of the liquid feed with the bowl wall. In another aspect, this invention relates to a centrifugal separator system which contains in combination with a separator bowl assembly, a distributor unit for delivering liquid feed to the walls of the bowl together with associated vane structure for facilitating improved separation capacity.

One disadvantage often inherent in centrifugal separation systems is that, when shutdown after operation, significant portions of the fluid treated are retained among the apparatus parts so that the entire assembly must be disassembled for cleaning, which, of course, is undesirable from the standpoint of time and equipment requirements that are inherently incurred, as well as the increased hazards involved when the material treated is explosive.

In the feeding of a liquid mixture into the separating chamber, or bowl, of a centrifugal separator, it is important that the liquid feed contact the effective surfaces of the bowl in a manner so as to be uniformly distributed thereon in order that the separation take place most efficiently. Thus, a major problem in the past has been that of introducing the liquid feed in such a manner as to cause it to be placed on the bowl surfaces with a minimum of turbulence so that the maximum amount of bowl surface can be applied to the actual separation. Further, it is important that the feed be introduced into the revolving separator in a manner which does not impair the balance of rotation of the separator.

Various liquids present problems peculiar to their own characteristics when involved in a centrifugal separation system. Particularly exemplary of such a mixture is total effluent from the nitration of glycerin, glycols and mixtures thereof to produce corresponding liquid explosive nitric esters, which from the hazard standpoint is advantageously handled in the smallest possible quantities.

In most prior art processes for separation of liquid explosive nitric esters from reaction mixtures containing same, there is an undesirably large amount of nitroglycerin or other liquid explosive nitric ester present in the separator tank so that should an accident occur, the amount of highly sensitive liquid explosive present is undesirably large. This invention is particularly concerned with apparatus for separating components of liquid mixtures, by centrifugal force, wherein (1) only a small liquid holdup is required; (2) high velocity feed is introduced into the separation chamber under conditions which quickly reduce turbulence of flow to provide for an improved efficiency of utilization of the chamber surfaces and which contribute markedly to a balanced rotation of the separator; (3) capacity can be increased as desired by vanes in the separation chamber; and (4) once the separator is shut down all fluids run out unimpeded so that a simple flush substantially completely cleans the assembly. The invention is particularly applicable to the separation of nitric ester and spent acid components of total nitric ester-spent acid effluent formed in the manufacture of nitric esters by the nitration of polyhydric alcohols, particularly glycerin, glycol, and mixtures thereof.

An object of the invention is to provide apparatus for the separation of components from liquid mixtures, by centrifugal force, and which is particularly advantageously applied to the separation of explosive liquid nitric esters from mixtures containing same. Another object is to provide a centrifugal separator system wherein liquid feed is distributed at high velocity to the separator chamber walls under conditions quickly minimizing turbulence of resulting liquid flow in the system and contributing to a balanced rotation of the separator. Another object is to provide a centrifugal separator system which requires only a low holdup of liquid charge. Another object is to provide a center feed and feed distribution assembly for a centrifugal separator with or without associated vane structure for improved capacity. Other aspects and objects will be apparent from the accompanying disclosure and the appended claims.

This application is a continuation-in-part of our copending application Serial No. 691,591, filed October 22, 1957, now abandoned.

In accordance with the invention a centrifugal separator for liquids is provided which comprises a rotatable bowl, closed at at least one end, and means for rotating said bowl; a first conduit extending into said bowl; a first dam along the perimeter of the bowl inner wall, and extending toward the interior of said bowl; a second dam along the perimeter of said inner wall and extending toward the interior of said bowl, and disposed intermediate said first dam and said closed end; a partition disposed intermediate said first and second dams about the perimeter of the said inner wall, and extending into the interior of said bowl; a fluid distributor member within said bowl and rotatable therewith, and disposed transverse to the rotational axis of said bowl, intermediate said second dam and the said closed end; said distributor means being operatively connected with said first conduit to lead fluid therefrom laterally and uniformly to the entire inner bowl wall; a first conduit means connecting with the wall of said second dam closest to said distributor and an inner wall surface of said bowl at a point intermediate said partition and said first dam; and a second conduit means inclined downwardly and connecting said inner bowl wall at a point intermediate said partition and said second dam with a point external to said bowl. In accordance with a preferred embodiment, a plurality of vanes is provided within the bowl, each upright along the bowl inner wall in a wall section intermediate the above described second dam and distributor assembly and extending from the inner bowl wall toward the bowl interior a distance at least as great as the contemplated depth of liquid along the said wall, whereby each pair of vanes supports a portion of liquid layer as a separate column against the wall to prevent slippage of same along the said wall. In most instances, therefore, the width of each vane member is greater than the height of the above said second dam, as further described hereinafter.

A centrifugal separator system for liquids, utilizing a dam assembly in conjunction with separate liquid receiving and separating chambers, conduit means disposed within the walls of the said chambers for conveying liquid from the receiving chamber to the separation chamber, and conduit means for feeding the liquid into the receiving chamber, is disclosed and claimed in the copending application of Joseph Stuart II, Serial No. 520,267, filed July 6, 1955, now U.S. Patent 2,840,303.

Figure 2:
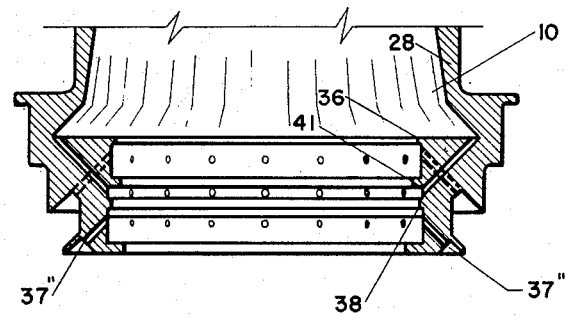
Figure 3:
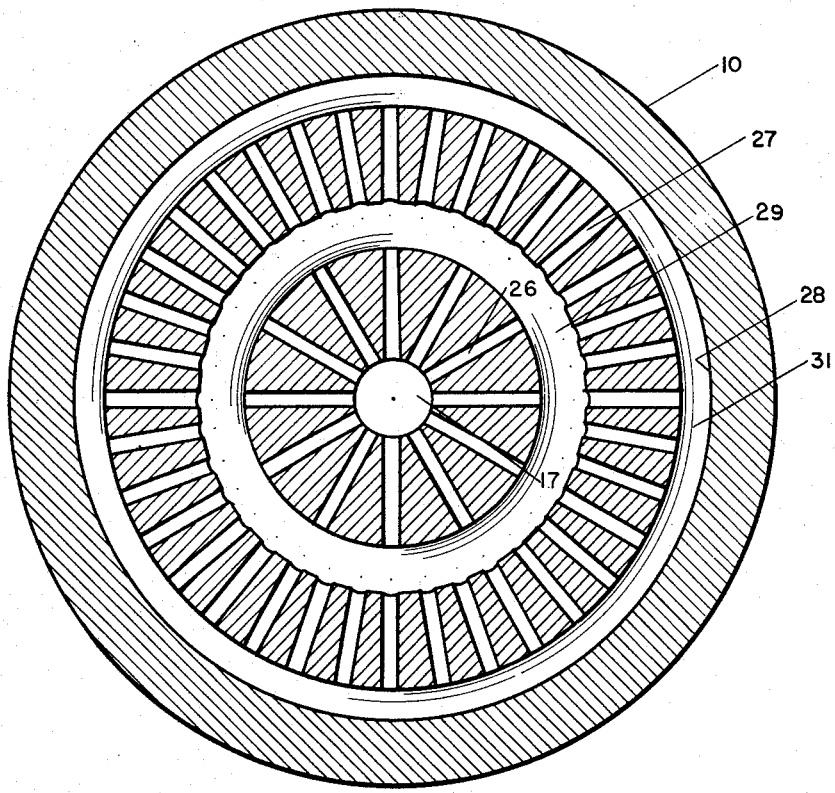
Figure 4:
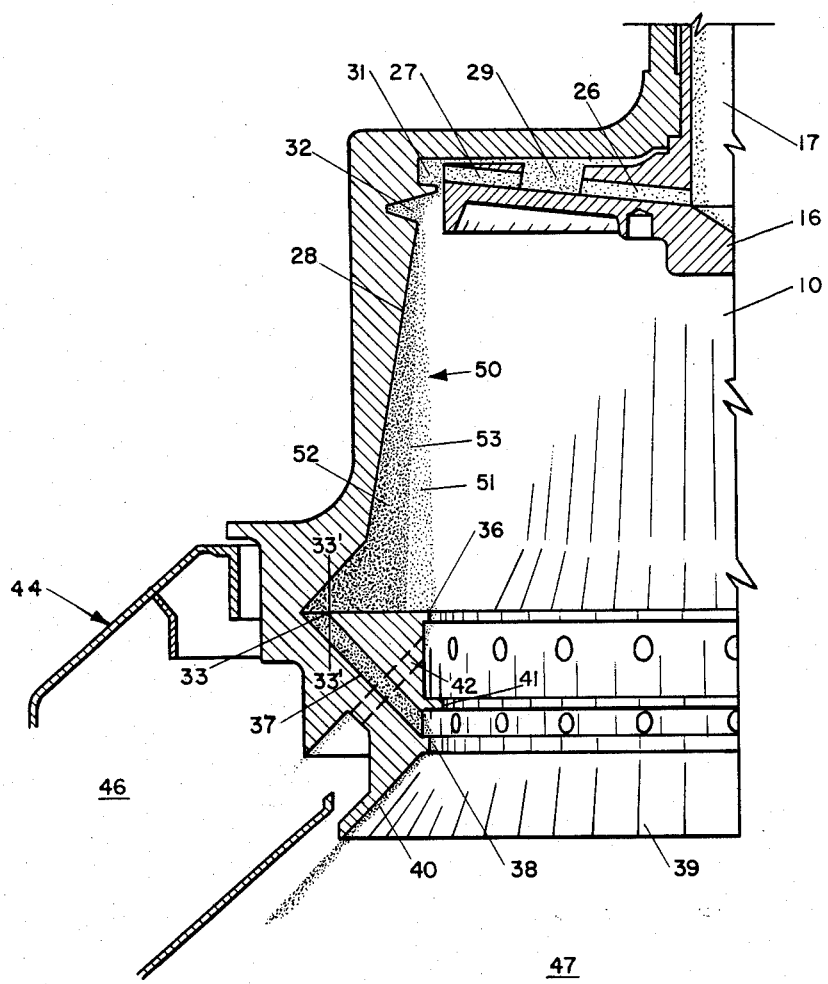
Figure 5:
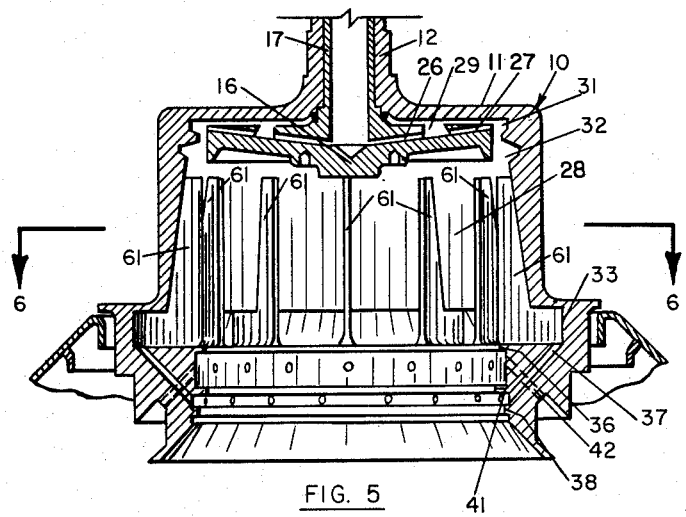
Figure 6:
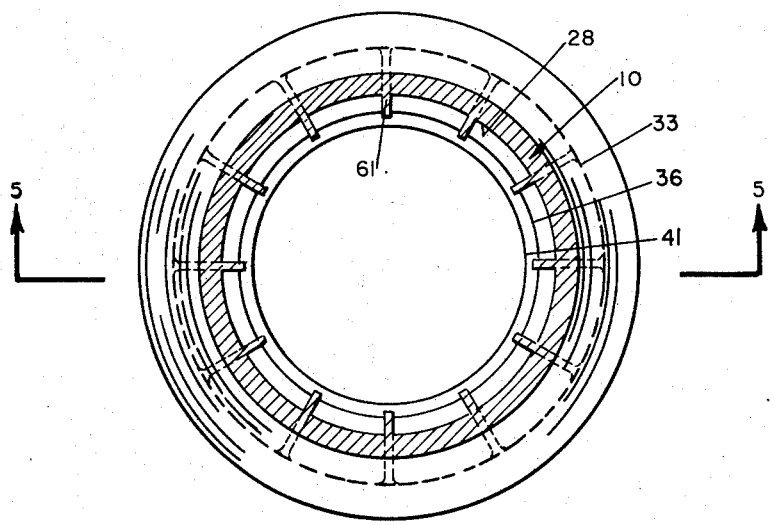
Figure 7:
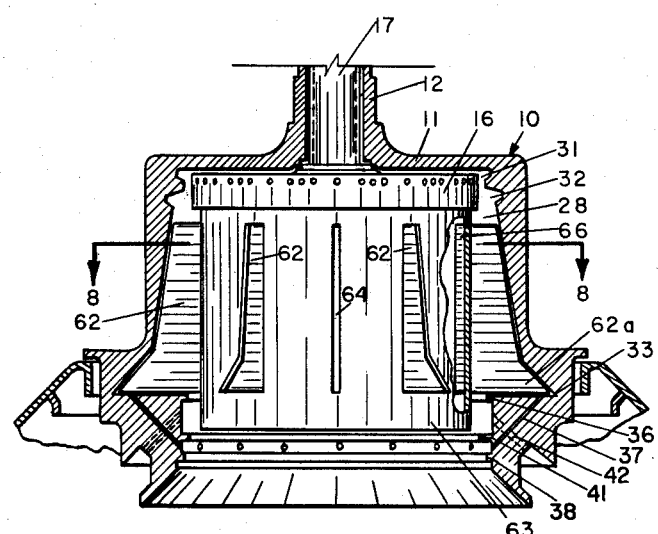
Figure 8:
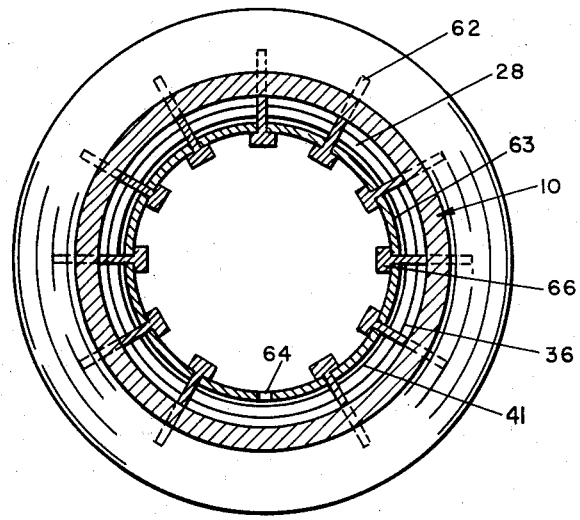

The invention is further illustrated with reference to the attached drawings of which FIGURE 1 is a front sectional view of one embodiment of a separator unit of the invention; FIGURE 2 is an additional sectional view of the device of FIGURE 1 exemplary of an additional set of conduits for conducting heavy liquid product from the assembly; FIGURE 3 is a cross-sectional view of apparatus in accordance with FIGURE 1 taken along the line 3—3; FIGURE 4 is a sectional view taken from FIGURE 1 further illustrative of liquid flow and separation in the device of FIGURE 1; FIGURE 5 is a cross-sectional view, along the line 5—5 of FIGURE 6, of one embodiment of a separator unit of the invention containing vanes along the length of the bowl wall, as an integral part of the bowl, for preventing slippage of liquid along the wall; FIGURE 6 is a full plan view taken along the line 6—6 of FIGURE 5; FIGURE 7 is a part sectional view of an embodiment of a separator unit of the invention containing vanes along the length of the bowl wall supported within the bowl and extending toward, and terminating close to, the said bowl inner wall; FIGURE 8 is a full plan view taken along the line 8—8 of FIGURE 7.

With reference to FIGURE 1, rotatable separator chamber, or bowl, 10 is closed at its top end 11 and is axially connected with hollow shaft 12 so as to be in direct communication with the interior of shaft 12. Bowl 10 and shaft 12, in a preferred embodiment, constitute a single forged unit. In any event, shaft 12 is operatively connected with chamber 10 so as to be rotatable therewith. Pulley assembly 13, which comprises two shive elements, one threadably connected with shaft 17 and the other with shaft 12, is adapted to be driven by belt means connected with a power source, not shown. The two shive elements are locked as a unit by pin means 14 so as to cause rotation of shaft 12 and bowl 10 as a single unit. Distributor device 16 is a disc-shaped member transversely closing substantially all of chamber 10 at a point in close proximity to the closed end 11 and is axially connected with hollow shaft 17 extending into shaft 12 coaxially therewith. Units 16 and 17 preferably constitute a single forged unit, the shaft 17 being threadably connected with pulley means 13 as illustrated at 18 so as to be secured within shaft 12 and thereby support distributor 16 in a transverse position within chamber 10. The threading arrangement at 18 also supports shaft 17 in contact with pulley 13 so as to be rotatable with shaft 12. Fluid inlet conduit 19 extends into hollow shaft 17 through its open end, opposite distributor 16, for a distance sufficient for it to deliver liquid feed via shaft 17 to distributor 16. Conduit 19 is generally terminated within shaft 17 at a point about ¼ to ¾ of the distance of the length of the shaft. Conduit 19 is supported in shaft 17 by any suitable means, a now preferred support comprising nozzle collar 21 supported by nozzle clamp 22 in turn supported by elements of a suitable conventional transmission and bearing assembly, within housing 23 which provides for balanced rotation of the shafts 12 and 17.

Distributor assembly 16 is preferably a disc-shaped member and is disposed so that shaft 17 terminates within bowl 10 in axial alignment, with the disc-shaped member 16, and preferably within member 16. A plurality of conduits 26 are disposed within member 16 and laterally extend from direct connected communication with the interior of shaft 17 through a portion of member 16. Conduits 27 in member 16, greater in number than conduits 26, are also laterally disposed from shaft 17 and extend from points beyond conduits 26 through the extremities of the disc member 16 preferably in an upward direction toward the inner side walls 28 of bowl 10. Conduit 29 is disposed within member 16 in closed direct communication with all of said conduits 26 and 27 and preferably is on a locus coaxial with shaft 17. Conduit 29, therefore, in common with conduits 26 and 27 serves as a connecting manifold therefor.

A first recess, or annular groove, 31 is disposed adjacent the top end 11 of chamber 10 in the inner wall 28 of chamber 10 and is directly aligned with conduits 27 so as to receive fluid flow directly from those conduits. Recess, or annular groove, 32 also disposed within inner wall 28 of chamber 10 is subjacent groove 31, and deeper than groove 31. Grooves 31 and 32 are each disposed with reference to the other and to a dam 36, as described hereinafter, and provide, in conjunction with distributor assembly 16, for arresting turbulent flow of high velocity liquids from conduits 27 against inner wall 28 so that when, or soon after, the liquid has passed from groove 32 it is static and fully subject to centrifugal force being applied so as to initiate separation of its components along the entire available inner wall surface 28. The inner walls 28 of bowl 10 are preferably disposed in an outward direction away from element 16, i.e., downwardly, to provide a radius of the interior bowl 10 of progressively increased value.

Recess, or annular groove, 33 in wall 28 is spaced away from groove 32 toward open end 39 of chamber 10. Dam member 36, in bowl 10, extends along the periphery of inner wall 28 from within recess 33 and terminates in a direction toward the interior of bowl 10. The top of dam 36 is below the lowest top point of the groove 31 on the side of groove 31 closest to dam 36, and is above the lowest top point of the groove 32 on the side of groove 32 closest to dam 36. Dam member 38, in bowl 10, also extends along the periphery of inner wall 28 and terminates in a direction toward the interior of bowl 10, and is disposed intermediate dam 36 and open end 39 of bowl 10. Partition member 41 extends along the periphery of the inner wall 28 intermediate dams 36 and 38 and terminates in a direction toward the interior of bowl 10 at a point in closer proximity to the axis of bowl 10 than that of either of said first and second dams. Conduits 37 extend from recess 33 at a point at, or near, the foot of dam member 36, to a point in direct communication with an inner wall portion 28 intermediate dam 38 and partition 41. Conduits 42 are inclined downwardly and connect the inner wall 28 at a point intermediate partition 41 and dam 36 with points outside chamber 10.

In a preferred form of apparatus, collector means 44 is utilized which comprises a collecting zone 46 disposed around a lower portion of chamber 10 so as to encompass the ends 42' of conduits 42, and collecting zone 47 similarly disposed around chamber 10 so as to encompass the discharge ends 37' of conduits 37, and peripheral edge 40 of bottom 39 of chamber 10. Collector assembly 44 is mounted in a stationary position and adapted to receive liquids from conduits 37 and 42, from chamber 10, for discharge or transfer via conduits 48 and 49, respectively.

With reference to FIGURE 2 is shown a lower section of chamber 10 wherein is provided a supplemental set of conduits 37″, in lieu of edge 40 of open end 39, for conducting heavy liquid from conduits 37 into chamber 47.

With reference to FIGURE 3 is shown conduits 26 radially disposed from shaft 17 in conjunction with manifold 29 and conduits 27, the now preferred embodiment utilizing about three of conduits 27 to one of conduits 26.

Operation of the assembly of FIGURE 1 is further illustrated with reference to FIGURE 4. Liquid from the center feed assembly, including conduit 19 and shaft 17, is introduced from distributor 16 radially through conduits 26, manifold 29 and conduits 27 directly into annular groove 31 under which conditions the liquid is under a high state of rotational velocity and is thereby in a high state of initial turbulence. Upon contacting the interior of groove 31, it is momentarily confined or entrapped so as to lose a sufficient amount of its energy and form a relatively quiet body. Liquid initially arrested in groove 31 is then caused to pass as a thin layer along a path intermediate the extremity of member 16 and inner wall 28 into groove 32, wherein substantially all remaining turbulence is arrested so that a substantially static layer of liquid is permitted to pass from groove 32, or soon thereafter, along wall 28. The liquid layer, as illustrated, is of substantially constant level along the entire wall portion 28 and begins to separate into phases soon after it initiates travel along the said inner wall. Thus, by the time the liquid layer contacts dam 36 there has been a separation into a light layer 51 and a heavy layer 52. Liquid from layer 52, by way of conduits 37, is dammed by dam 38 as one arm of a U-tube, the other arm being formed by liquid dammed by dam 36. As liquid is continuously fed into chamber 10 and the separation achieved, as illustrated, the liquid level 50 is built up so that light liquid from layer 51 overflows dam 36, and heavy liquid from conduits 37 overflows dam 38, both streams being then recovered in collector 44.

The relative heights of dams 36 and 38 are determined by the specific liquid mixture to be resolved. The height of the light liquid dam, dam 36, will always be greater than the height of the heavy liquid dam, dam 38. At any given height of one dam, the difference in height between the two dams is dependent on the specific gravity of each of the light and heavy liquid components. With an increase in length of dam legs, i.e., the dam heights, when resolving a given liquid, the dam height difference is also increased. Similarly, with a decrease in length of dam legs the dam height difference is decreased. For any given length of one leg, any liquid separation can be achieved by regulating the dam height difference, which difference will be a function of the specific gravity of each component phase.

Inasmuch as liquid columns against the two dams function as opposite legs of a U-tube, the withdrawal of liquid from the system resembles feeding two separate phases into one leg of the U-tube and regulating the leg heights so that when two-phase liquid is continuously passed into the one leg (against dam 36) there will be flow over both dams, top phase over the light liquid dam 36 and bottom phase over the heavy liquid dam 38.

When referring herein to dam height, it is meant the height of the dam as measured by the distance along a line vertically disposed toward the axis of the chamber 10 and extending to the top of the dam from a line touching the top surface of the bottom-most portion of the U, and parallel to the chamber axis, as shown in FIGURE 4 with reference to line 33'—33' which is parallel to the axis of chamber 10.

Utilizing a single bowl as both the receiver and the separator, in accordance with the invention, substantially all available chamber inner surface is utilized as separating surface so that there is no liquid body of nitric ester in the system awaiting treatment. Further, the novel arrangement of structure eliminates the need for more than a shallow layer of liquid in the system at any one time. In view of the improved means for the arrest of turbulence, substantially all inner surface area within the chamber is applied directly to the separation so that maximum capacity can be achieved from the available surface and no holdup is required along the inner wall for moving turbulently flowing liquids prior to initiating separation.

By way of a more specific illustration of a liquid feed to which the invention is particularly applicable, an ethylene glycol-glycerin mixture containing ethylene glycol in a suitable volume ratio to glycerin, 80/20 glycol/glycerin often preferred, is charged to a nitrator, with a nitrating acid, in a weight ratio of nitrating acid to total glycol-glycerin in the range of about 4:1 to 30:1, the nitrating acid comprising on a weight basis, generally from about 18 to 40 percent nitric acid, 45–70 percent sulfuric acid and about 11–17 percent water. However, when desired, the acid can comprise fresh concentrated nitric and sulfuric acid. The glycol-glycerin is substantially completely nitrated at a temperature of about 0 to 45° C. to form a liquid nitric ester and spent nitrating acid mixture as total effluent as a feed for the separator assembly of the invention. Total effluent is cooled, say to about 20° C., and then charged to a separator of the invention. Total liquid is radially directed from rotating shaft 17 via conduits 26 and 27 at a high linear velocity about the periphery of chamber 10, directly into annular groove 31 wherein resulting turbulent flow is arrested to a large degree. Total liquid having traveled from groove 31, and passed into and through groove 32, is free from turbulence to the extent that it forms a liquid body substantially static and moving along inner wall 28 toward dam 36.

By action of centrifugal force imparted from the rotating chamber 10, total liquid from groove 32 initiates separation into ester and spent acid components with ultimate formation of acid phase 51 and ester phase 52 separated by interface 53.

Liquid supported by dam 36 and containing acid from phase 52 and ester from phase 51 functions as one arm of a U-tube, the other arm being formed by acid from phase 52, in conduit 37, supported by dam 38.

The ultimately selected height differential permits a gradual flow of nitric ester over dam 36 for recovery via conduits 42 and a gradual flow of spent acid over dam 38 for recovery via the bottom edge 40 of the chamber.

By way of further example, a nitric ester-spent acid mixture, as effluent from a nitration of an 80/20 glycol/glycerin mixture, is separated into its nitric ester and spent acid components having respective specific gravities of 1.55 and 1.72, in a separator of FIGURE 1 in the order of about 9.75 to 9.80 inches in diameter at the level of dam 36 and 7 inches in length from inner wall of end 11 to the recess 33. The diameters of light liquid dam 36 and heavy liquid dam 38 (measured in each case across axis of bowl to top of dam), respectively, are 9.785 and 9.923 inches. The partition 41 height is 9.187 inches. The dam height difference is, therefore, .064 inch and the partition extends .299 inch beyond the light liquid dam 36, towards the axis of chamber 10. The purity of the nitric ester phase is over 99 percent, i.e., contains less than one percent spent acid.

Walls 28 are preferably inclined outwardly in a direction from the recess 32 toward the dam 36 so as to minimize the amount of holdup of nitric ester in the chamber. Thus, a straight wall, i.e., in a plane parallel to the axis of the chamber, would support a liquid body 50 having a depth equal to the height of the total liquid arm supported by dam 36 (FIGURE 4) which would, of course, require a larger liquid holdup than that illustrated.

Although the use of annular grooves 31 and 32 are considered of marked importance in the handling of the high velocity liquids introduced into the chamber in order to maintain a minimum holdup, either one, or both, can be dispensed with at the expense of a longer chamber 10 to provide the additional wall surface necessary for arresting the turbulent action of the initially introduced high velocity streams.

Distributor 16 need not in all instances substantially close chamber 10. Indeed, separation can be obtained utilizing a distributor assembly of radius markedly shorter than that of chamber 10 although under such conditions it is less effective in cooperation with groove 31 in limiting turbulence due to the concomitantly large area, in close proximity to groove 31, intermediate wall 28 and member 16.

Distributor 16 can, when desired, be disposed about normal to the axis of chamber 10 or in a downward direction therein although a larger holdup of liquid will result in view of the additional wall surface required for arresting turbulence of the resulting high velocity streams. Thus, a stream flowing in a downward direction contains additional momentum which must be overcome either by an extended wall surface or by an additional or larger annular groove element such as element 32, in either event there being additional liquid held up in the system.

The combination of center feed via the shaft 17 with a distributor assembly 16 provides a most advantageous mode of operation for delivering feed to the chamber 10 inner wall while at the same time driving the shaft 12 to rotate the chamber 10 by pulley assembly 13. However, if desired, liquid can be introduced axially into chamber 10, into a central portion thereof, by any suitably arranged conduit such as one connected to end member 11 by a swivel type connector or extending into the chamber through the bottom open end thereof. Chamber 10 can be driven by suitable means other than that illustrated, such as by a power means operatively engaged with its outside wall 28 to effect the rotation.

The maximum number of conduits 26 in distributor 16 is determined by the size of the individual conduits inasmuch as each conduit is radially extended from the shaft member 17. It is, however, important in order that a quantity of liquid be delivered to wall 28 equal to the maximum capacity, the available inner wall surface be utilized uniformly. Thus, as space within element 16 becomes available, it is advantageous to include additional radially disposed conduits so as to divide the body of liquid into still smaller parts for distribution along the inner wall surface to thereby more efficiently utilize the said surface.

When desired, liquid can be delivered to the top side (adjacent closed end 11 of chamber 10) of an assembly 16 from shaft 17 for delivery to the chamber inner wall. In such an embodiment, there is, of course, no need for conduits within element 16. However, there is some slippage of liquid flow on the top surface of distributor 16 so that liquids are dispensed therefrom at various points intermediate shaft 17 and wall 28 with concomitantly reduced linear velocities and loss in centrifugal force. Under such conditions, the result is a lowered capacity of the separator and a larger amount of wall space is required than when internal conduits such as conduits 26 and 27 are utilized. Thus, conduits 26 and 27 confine liquid flow to the extremity of distributor 16 so that the liquid contacts the wall 28 at a maximum rotational velocity along the inner wall with a maximum of initial centrifugal force. When feeding the liquid along the top of the distributor 16, vanes are advantageously disposed on the top surface to direct somewhat more of the liquid to the extremity of the assembly prior to its contact with inner wall 28.

Although the dams 36 and 38, and partition 41, are each preferably in a plane normal to the axis of chamber 10, they can, if desired, be disposed at other angles, the height of each, in any event, being the controlling factor, as above described. Similarly, although the said dams and partition are each preferably in a parallel plane they can, if desired, be disposed so as to not be included within a single plane.

With reference to FIGURE 5, vanes 61, in bowl 10, extend lengthwise along inner bowl wall 28 upwardly toward the closed end 11 from dam 36 and constitute an integral part of the bowl preferably formed by machining out a plurality of sections of wall 28 from a single forging of chamber 10 and shaft 12. Vanes 61 are sufficiently wide that they extend from wall 28 toward the interior of bowl 10 a distance beyond the level of liquid supported on wall 28 during centrifugation. Accordingly, they extend beyond the top of dam 36. Each pair of adjacent vanes 61 serves, during centrifugation, to partition or isolate a section, or column, of liquid along wall 28 by entrapping same to prevent any slippage of the liquid along the periphery of the wall, which if taking place reduces the effective capacity of the separator.

FIGURE 6, a full plan view of the separator assembly of the invention taken along line 6—6 of FIGURE 5, further illustrates vanes 61 as integral parts of chamber 10 and shaft 12 as a single unit.

With reference to FIGURE 7, distributor 16, with shaft 12, is supported in position in bowl 10 by engagement with shaft 12 described hereinabove. Cylinder, or collar, 63 is secured to the underside of distributor 16 preferably coaxially therewith and with bowl 10, and extends toward dam 36. In one embodiment, cylinder 63 is a part of a single forging from which shaft 17, distributor 16 and the cylinder 63, with slots 64, are machined. Cylinder 63 is spaced from the inner wall 28 of chamber 10 so as to dispose its external wall beyond dam 36, in order to support vanes 62 as described hereinafter, and beyond the top of partition 41 in order to be removable with distributor 16 from bowl 10 through the open end of the chamber, i.e., opposite end 11. A plurality of vanes 62 is secured in spaced apart relation to cylinder 63 and extends lengthwise along a portion of wall 28 intermediate dam 36 and distributor 16 adjacent both the bowl wall 28 and cylinder 63.

Vanes 62 can be secured to cylinder 63 in any suitable manner such as by insertion, from the interior of the cylinder 63, through slots 64 which extend through the wall of cylinder 63, and by retaining vanes 62 in position by elongated bar member 66 secured on the back side of the vane and disposed against the cylinder 63 inner wall when the vane is positioned. During rotation of the bowl 10, with which cylinder 63 rotates, the vanes 62 are firmly held in place by centrifugal force.

A full plan view of the separator assembly of the invention taken along line 8—8 of FIGURE 7 further illustrates vanes 62, in bowl 10, and support of same in cylinder 63 by slots 64 and bars 66.

It is preferable to maintain a clearance between the edges of vanes 62 adjacent wall 28 and the side of dam 36 to prevent any metal-to-metal contact of vanes 62 with those portions of bowl 10. Any suitable clearance will suffice such as from $\frac{1}{64}$ inch up to $\frac{1}{4}$ inch, or higher if desired. We have found, for example, that in resolving nitric ester-containing effluent from glycol nitration, in a separator of FIGURE 7, such clearance up to say $\frac{1}{4}$ to $\frac{1}{2}$ inch does not, generally, seriously impair efficiency of separation although there may be in certain instances some slippage with impairment of efficiency and particularly when greater clearances are utilized.

In assembling a separator of FIGURE 7 the combined distributor 16, shaft 17 and cylinder 63 are inserted into place in bowl 10 and shaft 12. The vanes 62 are then inserted in place from the interior of cylinder 63 as above described. Although each vane 62 is secured to a bar 66 in any suitable manner, the said bar and vane preferably constitute a single element machined from a suitable bar stock to eliminate thereby possibilities for any rough surfaces that might otherwise occur in connecting the two elements.

Any other suitable means other than a cylinder 63 can be utilized as support for vanes 62 in bowl 10. In any event it is essential that vanes 62 be of such a width that they extend into the interior of bowl 10 beyond the top of dam 36.

In the operation of the embodiments of FIGURES 5–8, liquid from conduits 27 of assembly 16 is introduced onto wall 28 and is moved toward dam 36, between adjacent pairs of vanes and then against dams 36 and 38 followed by flow of light liquid over dam 36 and heavy liquid over dam 38 as described hereinabove with reference to FIGURES 1–4.

Vanes 61 and 62 extend upwardly along wall 28 from dam 36 to a point at which flow of liquid along wall 28 becomes substantially uniform. The vanes are therefore terminated short of recess 32, and are still shorter in length when recess 32 and/or 31 are not utilized. By way of example, when resolving nitric ester-containing effluent from a glycol nitration, vanes 61 or 62 are advantageously about 5½ inches long when in a bowl which measures 7 inches from the dam 36 to the inner wall of the end 11, recess 32 in such event being about 6 to 6¼ inches upwardly from the dam 36. However, the length of vanes 61 or 62 can be varied somewhat without unduly impairing separation efficiency, although if they extend into a zone of nonuniform, or still somewhat turbulent, liquid flow along wall 28, a nonuniform loading of the sections intermediate adjacent vanes often results with concomitant unbalance of the bowl rotation and lowered separation efficiency, the extent of unbalance being dependent upon the degree of nonuniform flow upon contact of the liquid with the vanes. On the other hand, if the vanes are shorter than necessary for avoiding nonuniform flow conditions, there is no nonuniform loading but only a loss in the most efficient use of the wall portion of the bowl that could have supported vanes.

It is important in most instances that vanes 61 and 62 be uniformly disposed about inner bowl wall 28 particularly so as to maintain balance of rotation of bowl 10. The vanes are advantageously in planes parallel with the rotational axis of chamber 10 in order to maintain balance of the rotating chamber and to utilize most efficiently the available space between the vanes.

The number of vanes 61 and 62 can be varied dependent on the amount of slippage that otherwise takes place, which in turn depends to a large extent upon the feed, and bowl rotation, rates. However, it is generally advantageous that at least four vanes be utilized when the slippage problem is encountered, from about 8 to 12 being generally preferred. Thus, by way of illustration, in a separator of FIGURE 7 when feeding about 10,000 pounds per hour of spent acid-nitric ester effluent (about 4:1 acid to ester) at a rotation rate of 3000 to 3500 r.p.m., in a separator bowl 9.786 inches in diameter (measured at dam 36) and 7 inches in length from dam 36 to the inner wall of the top end 11 of the bowl, twelve vanes provide somewhat higher degree of separation efficiency than is provided by six vanes. However, when employing only four vanes, the improvement in efficiency is markedly lessened, although higher than that when no vanes are employed.

It is to be noted herein that in reference to the various figures of the drawings, like elements are identified by like numbers.

As discussed in this specification, in some embodiments certain element combinations constitute integral units.

Thus as illustrated with reference to FIGURES 5 and 6, vanes 61 and chamber 10 constitute, with shaft 12, a unit machined from a single forging; cylinder 63 is advantageously machined with distributor 16 and shaft 17 from a single forging; and each vane 62 with a bar 66 advantageously constitutes a single machined unit. These features are advantageous in the handling of explosive liquid nitric esters inasmuch as they eliminate chances for certain undesirable metal-to-metal contact and reduce chances for occurrence of rough surfaces for exposure to the nitric ester component of the liquid being handled, which features are highly desirable in the handling of such explosive liquids.

The following separations were made employing a vaned separator assembly of FIGURE 7. The separator utilized was 11⅜ inches in diameter as measured from the outlets 37 at the bottom of recess 33. Bowl 10 was 8⅞ inches in length as measured from dam 38 to the inner wall of closed bowl end 11. The tops of dams 36 and 38 were, respectively, 4.893 and 4.911 inches from the rotational axis of the bowl 10. The feed to the separator system was spent acid-nitroglycerin-containing effluent from a glycol-glycerin nitration employing sulfuric-nitric acid as the nitrating acid. The rate of feed to the separator was varied over each operating period and the separate effluent streams were sampled for analysis under established separating conditions at various times during the period. The following is a tabulation of representative data observed which demonstrates the high thuoghputs of nitric ester obtained together with the relative large volumes (about 4:1) of acid handled.

| Run No. | Nitration | | | Separation | | | | | |
|---|---|---|---|---|---|---|---|---|---|
| | Type of glycerin | Nitrating acid weight ratio $H_2SO_4/HNO_3$ | Acid/glycol-glycerin weight ratio | Bowl rotation rate, r.p.m. | Feed to bowl, °F. | Effluent streams | | | |
| | | | | | | Spent acid | | Nitric ester | |
| | | | | | | Lb./hr. | Weight percent nitric ester [1] | Lb./hr. | Weight percent acid [2] |
| A [a] | 80A [3] | 2.4 | 13.3 | 4,495 | 70 | 9,935 | 0.19 | 2,060 | None |
| B [b] | 50A [4] | 2.2 | 13.4 | 4,600 | 62 | 6,745 | 0.21 | 1,385 | None |
| C [c] | 80A [3] | 3.1 | 14.5 | 3,450 | 60 | 2,700 | 0.19 | 510 | None |

[a] Approximate time of run, 2 hours 45 minutes. Sample period, hours from start of run, 2 hours 35 minutes. Range of spent acid effluent rate, lb./hr. 6,720 to 10,420. Range of nitric ester effluent rate, lb./hr. 1,150 to 2,090.
[b] Approximate time of run, 2 hours 35 minutes. Sample period, hours from start of run, 1 hour 25 minutes. Range of spent acid effluent rate, lb./hr. 6,745 to 10,120. Range of nitric ester effluent rate, lb./hr. 1,370 to 2,100.
[c] Approximate time of run, 1 hour 30 minutes. Sample period, hours from start of run, 1 hour. Range of spent acid effluent rate, lb./hr. 2,740 to 4,610. Range of nitric ester effluent rate, lb./hr. 186 to 515.

[1] Undissolved nitric ester based on total glycerin-glycol charged.
[2] Undissolved acid—prior to conventional water washing, and/or neutralization.
[3] 80 percent diethylene glycol, 20 percent glycerin.
[4] 50 percent diethylene glycol, 50 percent glycerin.

We have found that in the separation of nitric ester and spent acid components of effluent from glycerin-glycol nitration in a separator of this invention, especially high throughput of the liquid can be accomplished when the depth of the recess 33 is at least ⅛ of the radius of the bowl (including recess 33). However, when such throughputs are utilized, extensive slippage of the liquid along the bowl wall, particularly within recess 33, occurs with unduly large impairment of separation capacity. Vanes along the inner wall of the chamber and within recess 33, e.g., vanes 61 or 62, serve to eliminate slippage of such high throughput liquids to provide for an efficient utilization of the high throughput thereby resulting in high efficiency and capacity of separation.

Thus, the above tabulated examples, with reference to vaned apparatus of FIGURE 5, illustrate high capacity obtained when utilizing the said vanes 61, the depth of recess 33 being in those instances ¼ of the above said radius which is greater than the above defined minimum depth of ⅛. The example set forth at column 6 illustrates high efficiency of separation obtained at somewhat lower capacities accomplished when the depth of the recess 33 is below the above referred to minimum depth value, there being no serious slippage problem under such circumstances so that there is very little need, if any at all, for the vanes along the inner wall and recess 33.

Further exemplary of liquid nitric ester components of the liquid nitric ester-spent acid mixtures to which the invention is particularly applicable are such esters obtainable by substantially complete nitration of liquid polyhydric alcohols, or mixtures thereof, such as diethylene glycol, triethylene glycol, propylene glycol, 1,2-butanediol, 1,3-butanediol, 2,3-butanediol, isopropyl ethylene glycol, glycerol α-chlorohydrin, and the like, to obtain diethylene glycol dinitrate, triethylene glycol dinitrate, propylene glycol dinitrate, 1,2-butanediol dinitrate, 1,3-butanediol dinitrate, 2,3-butanediol dinitrate, isoproply ethylene glycol dinitrate, glycerol α-chlorohydrin dinitrate, and the like. Esters formed by nitration of solid polyhydric alcohols in solution are also suitable components, e.g., the liquid ester formed by nitration of nitroisobutylglycerol dissolved in glycerol or glycol.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A centrifugal separator comprising a rotatable bowl closed at one end and open at the other end; a hollow shaft coaxially connected with the closed end of said bowl, in direct communication with the interior thereof, rotatable with said bowl, and adapted to be driven to rotate said bowl; a first conduit longitudinally disposed within said shaft and adapted to rotate with same; a liquid distributor element within said bowl disposed transverse to the rotational axis thereof in close proximity to said closed end and closing a substantial portion of said bowl, and axially connected in direct communication with the interior of said first conduit so as to be rotatable with said shaft; conduit means laterally disposed within said distributor, and in direct liquid tight communication with the interior of said first conduit and extending through the extremity of said distributor toward the side walls of said bowl; the inner wall of said bowl containing a groove formed about its entire periphery in substantially direct alignment with the said laterally disposed conduit means in said distributor; a first dam in said bowl extending along the periphery of said inner bowl wall toward the interior of said bowl, and disposed intermediate said open end and said distributor; said interior bowl wall containing a peripherally disposed recess along a portion thereof and disposed intermediate said groove and said first dam; a second dam in said bowl extending from said recess along the periphery of said inner wall toward the interior of said bowl and beyond said first dam, and the top of said second dam being below the lowest top point of said groove on the side thereof closest to said second dam; a partition member extending along the periphery of the inner wall of said bowl intermediate said first and second dams, and beyond said second dam; a plurality of vanes within said bowl each extending lengthwise adjacent said bowl inner wall in an area intermediate said second dam and said groove, and of width sufficient to extend toward the interior of said bowl beyond said second dam; a plurality of second conduits connecting said recess with an inner wall surface of said bowl at a point intermediate said partition and said first dam; and a plurality of third conduits inclined downwardly and connecting points along the said inner wall intermediate said partition and said second dam with the outside of said bowl.

2. A centrifugal separator comprising a rotatable bowl closed at one end and open at the other end; a hollow shaft connected with the closed end of said bowl and rotatable with said bowl, and adapted to be driven to rotate said bowl; a first conduit longitudinally disposed within said shaft and rotatable therewith; a liquid distributor element within said bowl disposed transverse to the rotational axis thereof in close proximity to said closed end and coaxially connected with said first conduit so as to be rotatable with said shaft; conduit means laterally disposed within said distributor, and extending through the extremity of said distributor toward the inner wall of said bowl, the inner wall of said bowl containing a groove formed about its entire periphery in substantially direct alignment with the said laterally disposed conduit means; the inner wall of said bowl being disposed outwardly so as to provide a radius of the bowl interior of progressively increased value in a direction toward said open end; a first dam in said bowl extending along the periphery of said inner wall of said bowl toward the interior of said bowl, and disposed intermediate said open end and said distributor; said inner wall of said bowl containing a peripherally disposed recess along the outwardly disposed portion thereof intermediate said first dam and said groove; a second dam in said bowl extending from said recess along the periphery of said inner wall toward the interior of said bowl beyond said first dam, and the top of said second dam being below the lowest top point of said groove on the side thereof closest to said second dam; a partition member extending along the periphery of the inner wall of said bowl intermediate said first and second dams beyond said second dam; a plurality of vanes within said bowl, each extending lengthwise adjacent said inner bowl wall in an area intermediate said second dam and said groove, and of width sufficient to extend toward the interior of said bowl beyond said second dam; a plurality of second conduits, within said bowl wall, connecting said recess with an inner wall surface of said bowl at a point intermediate said partition and said first dam; and a plurality of third conduits inclined downwardly and connecting through said bowl wall from points along the said inner wall intermediate said partition and said second dam with the outside of said bowl.

3. In a separator of claim 2, an additional groove along a periphery of the bowl inner wall in close proximity to the first said groove and intermediate the first said groove and the second said dam, the said additional groove being deeper than the first said groove, and said additional groove being disposed with reference to the first said groove and said second dam so that the top of said second dam is above the lowest top point of the side of said additional groove closest to said second dam; and said vanes constituting an integral part of said bowl wall and being spaced substantially uniformly apart, and extending from close proximity to said second dam toward but short of the said additional groove.

4. A centrifugal separator comprising a rotatable bowl open at its bottom end and closed at its top end; a first hollow shaft axially connected to the said bowl at the said closed end in direct communication with the interior of said bowl, so as to form a single forged unit with said bowl, whereby said first hollow shaft and said bowl are rotatable together; a second hollow shaft coaxially disposed within said first shaft and extending into said bowl; a distributor assembly within said bowl comprising a disc-shaped member axially disposed within said bowl tranverse to the rotational axis thereof in close proximity to the said closed end and substantially closing said bowl; said second shaft coaxially connecting with said disc-shaped member and terminating inside said member; a first conduit disposed coaxially in a top portion of said second hollow shaft, and in direct communication with the outside of said first and second shafts; a plurality of second conduits radially disposed within said disc member and connected in direct communication with said first conduit and terminating within said disc member; a plurality of third conduits, greater in number than said second conduits and extending from points beyond said second conduits through the extremities of said disc member, the said second and third conduits being disposed in an upward direction toward the walls of said bowl; a fourth conduit disposed within said disc member in direct communication with all of said second and third conduits as a connecting manifold therefor; a first recess along the periphery of the bowl inner wall, disposed in close proximity to the said closed bowl end and disposed so as to be in direct aligned communication with said third conduits; a second recess along a periphery of the bowl inner wall intermediate said first recess and the said bottom end of said bowl and in close proximity to said first recess, the said second recess being disposed with reference to said first recess and a second dam as described hereinafter, and deeper than said first recess; a third recess along a periphery of the inner wall of said bowl spaced from said second recess and intermediate said second recess and said bottom end of said bowl, and deeper than said second recess; the inner walls of said bowl extending from said second recess downwardly to said third recess in an outward direction to provide a radius of the bowl interior, of progressively increased value; a first dam member, in said bowl, extending along the periphery of the said bowl inner wall and terminating in a direction toward the interior of said bowl, and disposed intermediate said third recess and said open end; a second dam member in said bowl extending along a periphery of the said bowl inner wall from within said third recess and also terminating in a direction toward the interior of said bowl and being higher than said first dam, and the top of said second dam being below the lowest top point of said first recess on the side thereof closest to said second dam and above the lowest top point of said second recess on the side thereof closest to said second dam; a partition member extending along the periphery of the inner wall of said bowl intermediate said first and second dams and terminating in a direction toward the interior of said bowl and at a point in closer proximity to the axis of said bowl than that of either of said first and second dams; a plurality of vanes within said bowl extending lengthwise along the bowl inner wall from said second dam toward but short of said second recess and of width sufficient to extend into the interior of said bowl beyond the top of said second dam, and said vanes constituting an integral part of said forged unit; a plurality of fifth conduits in said bowl wall connecting said third recess at a point adjacent the said inner wall, with an inner wall surface of said bowl at a point intermediate said partition and said first dam; and a plurality of sixth conduits inclined downwardly within said bowl wall and connecting the inner wall surface of said bowl at a point intermediate said partition and said second dam with a point external to said bowl.

5. In a centrifugal separator particularly adaptable to the separation of liquid explosive nitric esters from mixtures containing same, the combination with a rotatable separating chamber closed at the top end, comprising a first conduit extending axially into a central portion of said chamber through said top end, and rotatable with said chamber; a transversely disposed disc-shaped distribution member within said chamber, rotatable with said chamber and axially connected with said first conduit; said distribution member closing a major portion of said chamber, and disposed in close proximity to said top chamber end; a plurality of second conduits laterally disposed within said disc member and connected in direct communication with the interior of said first conduit and terminating within said disc member; a plurality of third conduits within said disc member, greater in number than said second conduits, and laterally extending from points beyond said second conduits through the extremities of said disc member, the said second and third conduits being disposed in an upward direction toward the side walls of said chamber; a fourth conduit disposed within said disc member in closed direct communication with all of said second and third conduits as a connecting manifold therefor; a first recess along the periphery of the bowl inner wall, disposed in close proximity to the said top end so as to be in direct aligned communication with said third conduits; a second recess along a periphery of the bowl inner wall intermediate said first recess and the end of said chamber opposite the said top end, in close proximity to said first recess, disposed with reference to said first recess and a second dam as described hereinafter, and deeper than said first recess; a first dam in said bowl extending along a periphery of said inner bowl wall toward the interior of said bowl, and disposed intermediate said second recess and the end of said chamber opposite the closed top end thereof; a second dam in said bowl intermediate said first dam and said second recess extending along the periphery of said bowl inner wall toward the interior of said bowl and beyond said first dam, and the top of said second dam being below the lowest top point of the said first recess on the side thereof closest to said second dam and being above the lowest top point of the said second recess on the side thereof closest to said second dam; a partition member extending along the periphery of the inner wall of said bowl intermediate said first and second dams and beyond said second dam; a plurality of fifth conduits connecting the side of said second dam closest to said second recess with the inner wall surface of said bowl at a point intermediate said partition and said first dam; and a plurality of sixth conduits inclined downwardly within said bowl wall and connecting the inner wall surface of said bowl intermediate said partition and said second dam with the outside of said bowl.

6. A centrifugal separator for liquids which comprises a rotatable bowl, closed at one end, and means for rotating said bowl; a first conduit extending through said closed end into said bowl substantially along the rotational axis of said bowl and terminating as described hereinafter; a first dam along the periphery of the bowl inner wall, and extending toward the interior of said bowl; a second dam along the periphery of said inner wall, extending toward the interior of said bowl and being higher than said first dam, and disposed intermediate said first dam and said closed end; a partition disposed intermediate said first and second dams along the periphery of the said inner wall and extending toward the interior of said bowl beyond said second dam; a fluid distributor member within said bowl closing a substantial portion of said bowl and being rotatable therewith, said distributor member being disposed intermediate said second dam and said closed end, and said first conduit terminating within said bowl in a central section of said distributor member; said distributor member containing a plurality of passageways laterally extending from said central section thereof in direct open communication with the interior of said first conduit, toward the inner wall surface of said bowl, and terminating about the outer periphery of said distributor member in open communication with said inner wall surface of said bowl; said bowl inner wall containing a groove formed about its entire periphery in substantially direct alignment with the said passageways terminated as above described, and the top of said second dam being below the lowest top point of said groove on the side thereof closest to said second dam; a second conduit in the wall of said bowl leading from the wall of said second dam facing the said distributor member to the wall of said first dam facing said partition; and a third conduit in the wall of said bowl leading from the wall of said second dam facing said partition in a direction away from said closed end to the outside of said bowl.

7. A centrifugal separator assembly of claim 6 containing a plurality of vanes within the said bowl each extending lengthwise adjacent the said inner wall surface of said bowl in an area intermediate said second dam and said groove, and of width sufficient to extend toward the interior of said bowl beyond said second dam.

8. In a separator of claim 7, a cylindrical member disposed in said bowl coaxially therewith and spaced from the inner wall surface of said bowl so as to dispose the external wall of said cylindrical member beyond the top of said second dam; and said plurality of vanes being spaced substantially uniformly apart and extending lengthwise adjacent said inner wall surface of said bowl and said external wall of said cylindrical member, and secured to said cylindrical member.

9. In a separator of claim 7, said plurality of vanes being disposed in substantially uniformly spaced apart relation and constituting an integral part of said bowl.

References Cited in the file of this patent

UNITED STATES PATENTS

| | | |
|---|---|---|
| 1,870,608 | Dahlgren | Aug. 9, 1932 |
| 1,967,032 | Lindberg | July 17, 1934 |
| 2,082,608 | Ayres | June 1, 1937 |
| 2,536,423 | Cohen et al. | Jan. 2, 1951 |
| 2,840,303 | Stuart | June 24, 1958 |
| 2,862,658 | Dahlgren | Dec. 2, 1958 |
| 2,947,471 | Beams et al. | Aug. 2, 1960 |

FOREIGN PATENTS

| | | |
|---|---|---|
| 801 | Great Britain | Apr. 28, 1900 |